May 5, 1959    R. W. GRISWOLD II    2,885,160
CIRCULATORY JET AIRFOILS
Filed June 1, 1954
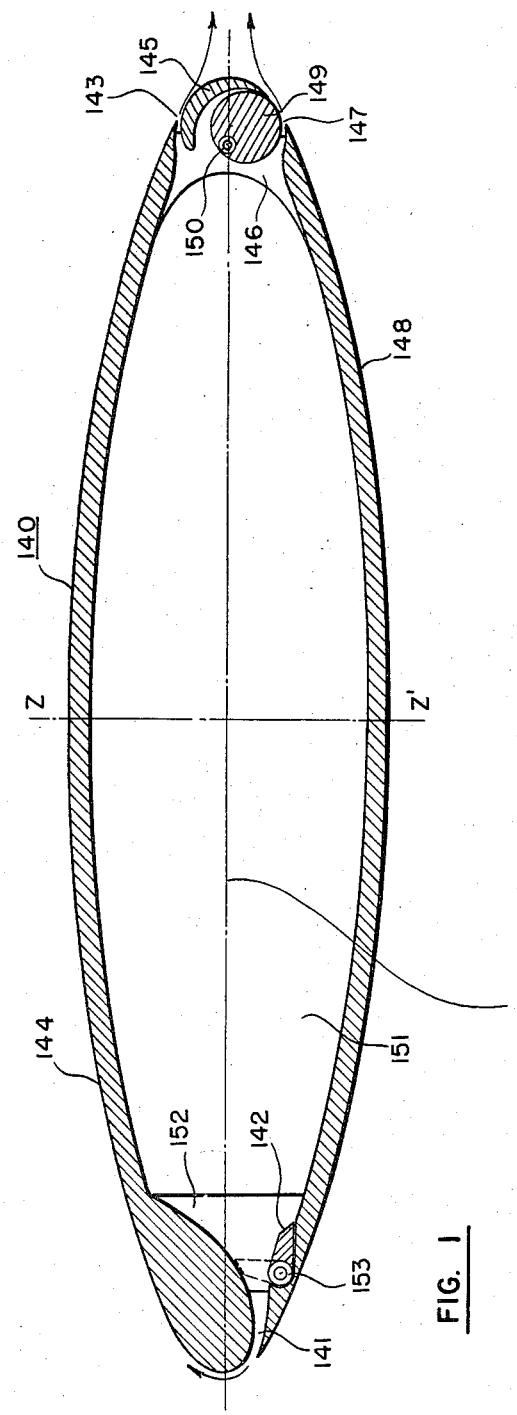
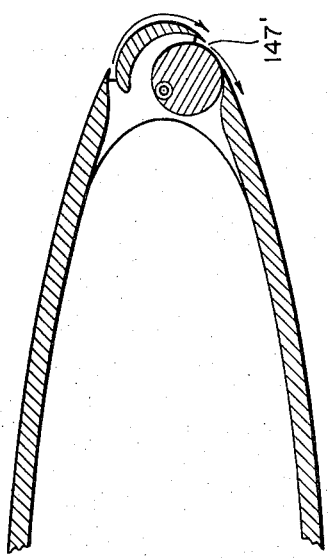
INVENTOR.
ROGER W. GRISWOLD II
BY
Frank H. Border
Attorney

United States Patent Office 2,885,160
Patented May 5, 1959

2,885,160

CIRCULATORY JET AIRFOILS

Roger W. Griswold II, Old Lyme, Conn., assignor to Elizabeth M. Griswold, doing business as Griswold Company, Old Lyme, Conn.

Application June 1, 1954, Serial No. 433,322

7 Claims. (Cl. 244—40)

This invention relates to powered airfoil blowing jet systems.

Application Serial No. 426,665, filed by applicant on April 30, 1954, specified the basic principles of powered airfoils having effectively rounded leading and trailing edges which function by means of a leading edge blowing jet and rearwardly disposed suction means comprising a dual function flow control system, respectively providing circulation control (CC) and boundary layer control (BLC) about the air foil, i.e. direct lift and essentially potential flow respectively, minus any trailing edge flap device and without essential requirement for moving parts of any kind within the airfoil system, per se. A combination ejector pump and alternative propulsor unit to energize and augment, respectively, the suction flow of the BLC element of the dual flow control system, was also disclosed. Further features included various control means for elements of the system and means whereby operation of the flow control system was effective to avoid or to minimize any change in pitching moments on the airfoil throughout a large range of lift coefficients.

Among the objects of this invention are to provide plural trailing edge or rearwardly disposed airfoil blowing jet means, at least one element of which is adjustable and effective to provide self-propulsive effects in one adjustment thereof, and relatively large CC and BLC effects including substantially instantaneous change in circulation about the airfoil in another adjustment thereof; the combination of leading and trailing edge blowing jet means to further augment the CC and BLC effects about the airfoil; a jet powered air foil having rounded leading and trailing edge sections thereof and plural blowing jet means disposed therein and with the jets operatively issuing therefrom aimed generally in alignment with the circulatory flow about the airfoil; and to provide other objects and benefits which will become apparent as the description proceeds.

In the accompanying drawings:

Figures 1 and 1a are schematic cross sectional views, the latter being an illustratively rear section segmental view, of a 25% thick powered airfoil having rounded leading and trailing edge sections and being bilaterally-symmetrical about vertical axis Z—Z', incorporating a leading edge blowing jet nozzle with flow shut-off means therefor, a plurality of blowing jet nozzles in the trailing edge region of the airfoil with an adjustable valve providing lower surface nozzles alternatively directed generally with, as in Figure 1, or against, as in Figure 1a, the relative airflow in respective adjustments of the valve, and a pressure duct communicating with the leading and trailing edge nozzles.

Recent visualized flow investigations in the large smoke tunnel of The James Forrestal Research Center at Princeton University, have shown that the Figure 1 type of flow control system provides by itself, i.e. without use of any flap or other mechanical devices, extremely powerful CC which indicates attainment of substantially larger values of maximum lift than is available with any flapped-airfoil combination so far tested, so far as known to applicant. In fact, as the blower power was increased, the trailing edge jets directed the local flow around the terminal end of the airfoil and against the lower surface flow, progressively moved the rear stagnation point forward until it became substantially coincident with the front stagnation point. Thus, the circulation was so great as to effectively provide a single lower surface stagnation pressure point which phenomenon corresponds to the optimum magnus type circulation that is attainable with the classic rotating cylinder. Substantially the same change in circulation could be attained with the bilaterally-symmetrical airfoil tested, as a function of the applied blowing jet momentum, irrespective of whether the airfoil was at zero degrees or at large positive angle-of-attack. Sudden application of the blowing jet flow control system resulted in correspondingly instantaneous changes in the circulation.

In view of the foregoing qualitatively-confirmed observations, several practical applications of the Figure 1 all-blowing-jet form of the invention, without need for cumbersome high-pitching-moment flaps or change in angle-of-attack, will be readily apparent, on the basis of the instant disclosure. First, with respect to fixed-wing aircraft, primary propulsion can be provided, if desired, in the high speed range when leading edge nozzle 141 is effectively closed by valve 142, or otherwise shut-off, as shown by the dotted line position thereof, and with rearwardly-directed trailing edge nozzles, comprised of upper nozzle 143, formed by juxtaposition of the rear section of upper surface 144 and terminal curved segment 145 both of which are relatively fixed to rib 146, and lower nozzle 147, formed by juxtaposition of the rear section of lower surface 148 relatively fixed to rib 146 and efflux-directing eccentric valve 149 pivotally mounted at 150 to rib 146, for the case of the rearward adjustment of valve 149 to form rearwardly directed nozzle 147 as shown in Figure 1. The above statement respecting attainment of the self-propulsive function for not only the airfoil but the entire aircraft as well, presupposes, of course, that the primary power plant discharges the propulsive flow into wing duct 151, formed by upper surface 144 and lower surface 148, duct 151 being spanwisely extensive and communicating with nozzles 141, 143 and 147. Obviously, separate ducts respectively communicating with the leading and trailing edge nozzles, can be used if desired, such as for the case of supplying combustion flow to nozzles 143 and 147, and gas turbine compressor bleed airflow, for example, on an intermittent basis to nozzle 141, in which case valve 142 would be redundant and could therefore be dispensed with since suitable control means for such compressor bleed would normally be provided at the engine. Nozzle 141 is formed by juxtaposition of the forward sections of upper surface 144 and lower surface 148 both of which are relatively fixed to rib 152, which also pivotally mounts valve 142 at 153.

In the low speed range wherein the blowing jet system is capable of providing a large degree of CC about the airfoil, valve 142 will be open as shown by the solid line position thereof in Figure 1, while valve 149 will be rotated forwardly so as to effectively close rearwardly-directed lower nozzle 147 and open forwardly-directed lower nozzle 147' as shown by Figure 1a. In the high speed configuration of this unique flow control system as shown by Fig. 1, both trailing edge jets issuing from rearwardly-directed nozzles 143 and 147 uniformly diffuse over the downstream face of segment 145 to fix the rear dividing streamline and stagnation point substantially equi-distant between each jet with corresponding rise in terminal pressure on the airfoil. The resultant decrease in pressural drag is accompanied by an appreciable reduction in the viscous skin friction drag along upper and lower surfaces 144 and 148, respectively, due to the BLC sink (i.e. suction) effect of the blowing jets. Thus, the recovery of pressure on the airfoil is nearly complete. In the low speed configuration thereof as indicated by Figure 1a, the jet from upper nozzle 143 follows the outer surface of rounded terminal segment 145 and merges with the jet from lower nozzle 147' to provide forwardly-directed impingement of the conjoint jet flow against the lower surface local flow, until the respective velocities and pressures thereof are equalized, which accordingly determines the forwardly-displaced position of the rear dividing streamline and stagnation point, as a direct function of the trailing edge blowing jet momentum so applied and as the indirect function of the operative leading edge blowing jet, which leading and trailing edge jets likewise cooperatively control the position of the front dividing streamline and stagnation point, as well. Upper nozzle 143 is so situated that the sink effect of the jet issuing therefrom, provides sufficient BLC to inhibit or preclude separation of the upper surface flow at high values of lift, which in any case cannot occur, given sufficiently high blowing jet velocity issuing from leading edge nozzle 141. The dispositions of nozzles 143 and 147' are likewise so related that the jet from the former will follow terminal segment 145 without separating therefrom. So long as the above-mentioned separation-control phenomena obtain, separation of the local flow externally of the trailing edge jet but contiguous therewith, can not occur since the flow does not separate from itself, this phenomenon only being precipitated by contact of the flow with a surface, due to various factors such as viscosity, skin friction and curvature, for the incompressible flow case. The anti-drag effects of the leading edge jet will effectively contribute to propulsion at high values of lift in the low speed range. It will also be observed that valve 149 can be moved to an intermediate position whereby lower nozzles 147 and 147' will both be partially operative and directionally effective, mutually to control the angle of downwash over the airfoil functionally with the respective nozzle openings. It will be clear that when either of these lower nozzles 147 or 147' is effectively closed, the other will then be exclusively effective as between these two nozzles, per se, respecting such downwash control, as further affected in all cases by the jet discharging from the upper nozzle 143. The foregoing effects can be adjusted to complementally vary the direct-lift and the self-propulsive airfoil functions. In this connection, it will be also perfectly obvious that many other configurations of the plural trailing edge blowing jets which effectively accomplish the above-recited objectives, can be evolved on the basis of the flow control and propulsive principles herewith disclosed. It will further be clear that the plural trailing edge blowing jet means of this invention may be used alone, or in combination with leading edge blowing jet means which likewise may comprise plural jets if desired, for those cases where optimum direct-lift and propulsive effects are required. Alternatively to the leading edge blowing jet, forwardly disposed BLC suction means could be incorporated in such a trailing edge blowing jet system to control leading edge separation. Also that the rotary-wing applications may be comprised of the simple combination of the forwardly-aimed lower surface leading edge jet with a corresponding rearwardly-aimed upper surface trailing edge jet, minus any adjustable nozzle features.

The Figure 1 type of flow control system has particularly beneficial features for applications in various configurations to rotary-wing aircraft. As pointed out in application Ser. No. 426,665, valve 142 would not be required since cyclical valvate action of the leading edge jet can be automatically provided as a function of the proper blowing jet pressure ratios and location of the jet efflux substantially coincident with the front stagnation point of the airfoil on the advancing blade. Similarly, with respect to the helicopter application of trailing edge jets, valve 149 could be relatively fixed whereby the operative jets would issue from nozzles 143 and 147' continuously in the direction of the circulation about the airfoil, in view of the fact that with essentially constant absolute velocity of the blowing jets cyclical valvate action, in effect, will result during translational flight from the respectively increasing and decreasing relative local flow velocities over the advancing and retreating blades. Thus it will be apparent that by combining merely the simple leading and trailing edge circulatory flow blowing jets of this invention, the rotor blade can function throughout an extremely wide range of lift coefficients and advance ratios as substantially constant angle-of-attack, since the all-blowing-jet system of Figure 1 will provide very powerful circulation-surge phenomena, i.e. precipitous and direct increase of lift on the retreating blade and decrease thereof on the advancing blade, as a function of blade rotation and translation and easily within the frequency limits required for current or presently contemplated helicopter operations, for example. Accordingly, the customary articulation of the blades that permits angle-of-attack changes as a consequence of blade flapping may be dispensed with on the basis of the art taught by this invention, the natural resiliency of the rotor blades ordinarily being sufficient to accommodate any residual moderate local bending thereof.

It will be apparent that various means and modifications of means are available for powering the blowing jet, as are well known in the art.

Such alternatives and various other modifications of the invention are to be construed as within the scope of the invention, unless otherwise expressly negatived by the phraseology of the appended claims.

Having thus described my invention, I claim:

1. A powered airfoil having upper and lower surfaces merging into rounded leading and trailing edge sections thereof, plural jet nozzle means one of which is forwardly directed relative to freestream flow over said airfoil and curves into one surface of said leading edge section asymmetrically thereof and another of which nozzle means is rearwardly directed relative to said free-stream flow and curves into the surface of said trailing edge section asymmetrically thereof opposite to said one surface, duct means for transporting relatively high pressure fluid flow therethrough when operatively pressurized and communicating with said nozzle means for discharging plural jets therefrom into the external flow about said airfoil, whereby said blowing jets discharge in the direction of the circulatory flow thereover to provide direct-life on said airfoil as a function of said duct flow pressurization.

2. A powered airfoil as in claim 1, wherein another of which nozzle means is rearwardly directed relative to said free-stream flow and curves into the surface of said trailing edge section asymmetrically thereof in said one surface, whereby its blowing jet discharges substantially against said circulatory flow to provide thrust on said airfoil cooperatively with said first-mentioned blowing jets.

3. A powered airfoil as in claim 1, wherein another of which nozzle means is forwardly directed relative to said free-stream flow and curves into the surface of said trailing edge section asymmetrically thereof in said one surface, whereby its blowing jet discharges in the direction of said circulatory flow.

4. A powered airfoil as in claim 3, wherein another of said nozzle means is rearwardly directed relative to said free-stream flow and curves into the surface of said trailing edge section asymmetrically thereof in said one surface, whereby its blowing jet discharges substantially against said circulatory flow.

5. A powered airfoil as in claim 4, and valve means for said last two mentioned nozzle means to provide selected adjustments thereof.

6. A powered airfoil as in claim 1 and valve means for said first mentioned nozzle means to control its said jet discharge.

7. A powered airfoil having upper and lower surfaces merging into rounded leading and trailing edge sections thereof and a mean camber line defining the juncture of said surfaces, plural jet nozzle means one of which is forwardly directed relative to freestream flow over said airfoil and curves into one surface of said leading edge section asymmetrically thereof on one side of said mean camber line and another of which nozzle means is rearwardly directed relative to said freestream flow and curves into the surface of said trailing edge section asymmetrically thereof on the other side of said mean camber line, duct means for transporting relatively high pressure fluid flow therethrough when operatively energized and communicating with said nozzle means for discharging plural blowing jets into the external flow about said airfoil, whereby said blowing jets discharge in the direction of the circulatory flow thereover to provide direct-lift on said airfoil as a function of said duct flow pressurization.

References Cited in the file of this patent

UNITED STATES PATENTS

| | | |
|---|---|---|
| 1,734,263 | Many | Nov. 5, 1929 |
| 1,775,757 | Gay | Sept. 16, 1930 |
| 1,852,167 | Kinsel | Apr. 5, 1932 |
| 1,979,298 | Trey et al. | Nov. 6, 1934 |
| 2,266,529 | Wright | Dec. 16, 1941 |
| 2,406,916 | Stalker | Sept. 3, 1946 |
| 2,478,793 | Trey | Aug. 9, 1949 |
| 2,518,697 | Lee | Aug. 15, 1950 |
| 2,540,991 | Price | Feb. 6, 1951 |

FOREIGN PATENTS

| | | |
|---|---|---|
| 252,053 | Switzerland | Nov. 30, 1947 |
| 589,420 | Germany | Dec. 7, 1933 |
| 977,072 | France | Nov. 8, 1950 |